United States Patent [19]

Haberstock et al.

[11] Patent Number: 4,717,179

[45] Date of Patent: Jan. 5, 1988

[54] PIPE UNION FOR END TO END PIPES WITH DEFORMABLE CLAMPING DISKS SURROUNDING A SEAL

[75] Inventors: Rolf Haberstock, Kuessabert 1-Kadelburg; Heinrich Trissler, Donaueschingen; Nikolay Vlaykowski; Hans P. Maier, both of VS-Schwenningen, all of Fed. Rep. of Germany

[73] Assignee: Agintec AG, Pfaeffikon, Switzerland

[21] Appl. No.: 837,825

[22] Filed: Mar. 10, 1986

[30] Foreign Application Priority Data

Mar. 8, 1985 [DE] Fed. Rep. of Germany ....... 3508296

[51] Int. Cl.⁴ .............................................. F16L 19/08
[52] U.S. Cl. ..................... 285/112; 285/319; 285/369; 285/348; 285/340; 285/343
[58] Field of Search .............. 285/112, 340, 371, 921, 285/348, 319, 369, 339, 402, 341, 382.7, 408, 343

[56] References Cited

U.S. PATENT DOCUMENTS

| | | | |
|---|---|---|---|
| 1,516,397 | 11/1924 | Mueller | 285/340 |
| 2,444,380 | 6/1948 | Shimek | 285/340 |
| 2,466,294 | 4/1949 | Allen | 285/336 |
| 2,653,042 | 9/1953 | Aldrich et al. | 285/112 |
| 2,670,223 | 2/1954 | Ream | 285/340 |
| 2,852,282 | 6/1958 | Smisko et al. | 285/112 |
| 3,058,762 | 10/1962 | Howe | 285/340 |
| 3,116,078 | 12/1963 | Scherr | 285/112 |
| 3,189,371 | 6/1965 | Swan | 285/336 |
| 3,204,988 | 9/1965 | Ouderkird et al. | 285/340 |
| 3,365,217 | 1/1968 | Nicolaus | 285/340 |
| 3,454,287 | 7/1969 | Thressen | 285/112 |
| 3,498,649 | 3/1970 | Pfeuffer | 285/336 |
| 3,580,617 | 5/1971 | Ehrenberg | 285/340 |
| 3,679,241 | 7/1972 | Hoffmann | 285/340 |
| 3,776,579 | 12/1973 | Gale | 285/233 |
| 3,837,687 | 9/1974 | Leonard | 285/340 |
| 4,181,329 | 1/1980 | Helm | 285/340 |
| 4,372,586 | 2/1983 | Rosenberg et al. | 285/369 |
| 4,418,948 | 12/1983 | Lew et al. | 285/112 |
| 4,480,861 | 11/1984 | Cann, Jr. | 285/368 |

FOREIGN PATENT DOCUMENTS

| | | | |
|---|---|---|---|
| 0087702 | 2/1983 | European Pat. Off. | |
| 1925171 | 11/1969 | Fed. Rep. of Germany | 285/340 |
| 2309783 | 11/1976 | Fed. Rep. of Germany | 285/340 |
| 3206570 | 7/1983 | Fed. Rep. of Germany | 285/336 |
| 3508296 | 1/1987 | Fed. Rep. of Germany | |
| 707778 | 6/1966 | Italy | 285/340 |
| 1178248 | 1/1970 | United Kingdom | 285/112 |

Primary Examiner—Richard E. Moore
Assistant Examiner—Eric K. Nicholson
Attorney, Agent, or Firm—Schwartz, Jeffery, Schwaab, Mack, Blumenthal & Evans

[57] ABSTRACT

A pipe union for joining two pipe ends in an end-to-end relationship. On each pipe end a flange, at least one clamping element, and one chamber element are fitted, which can be braced against one another and which among them enclose a shaped seal, each of whose two axial ends protrudes into a respective adapted recess of the chamber elements covering the seal. The seal is an outer elastomer ring supported on the jacket faces of the two pipe ends and has a central annular groove open to the inside. An inner ring that overlaps the butt joint is loosely pressed into this central annular groove. The clamping elements are supported with a radially inwardly located clamping rim on the associated pipe end, and with a radially outwardly located clamping rim on a clamping face disposed concentrically with respect to the pipe ends. The clamping elements are curved outward in the axial direction in such a manner that an axial force exerted upon the clamping element in the direction toward the butt joint causes an increase in the clamping element. The invention provides that the clamping element and the chamber element are each embodied by one clamping disk.

21 Claims, 15 Drawing Figures

Fig.9
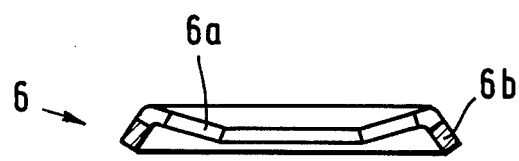
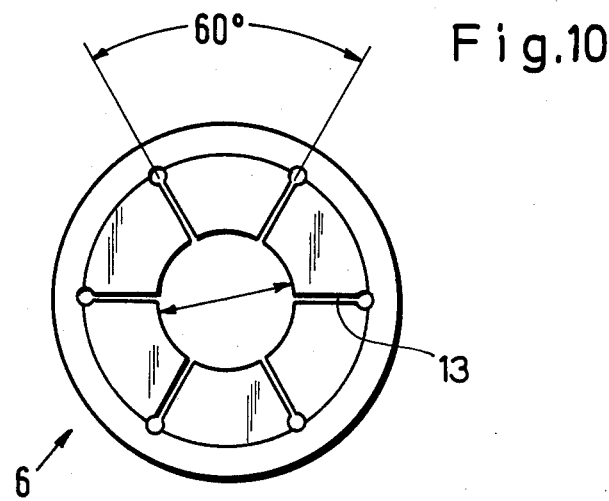
Fig.10

PIPE UNION FOR END TO END PIPES WITH DEFORMABLE CLAMPING DISKS SURROUNDING A SEAL

BACKGROUND OF THE INVENTION

The invention relates to a pipe union between two pipe ends to be joined in end-to-end relation to one another, onto each of which a flange, at least one clamping element, and one chamber element are fitted, which can be braced against one another and which among them enclose a shaped seal.

A pipe union is disclosed, for example in German patent disclosure document German Offenlegungsschrift No. 32 06 570. Here, the flange has a circular clamping chamber which is open toward the butt joint. Clamping elements are inserted into this clamping chamber, which elements comprise a convex disk that is supported with its radially outwardly located clamping rim on an annular clamping face of the clamping chamber. In the relieved state, the clamping element protrudes outward beyond the end face of the associated flange. The chamber element has an approximately triangular outer contour and is provided with a sealing chamber that is open toward the butt joint and is conical in shape, that is, it tapers toward the adjacent flange. The outer contour of the shaped seal is approximately equivalent to that of the two sealing chambers in the two chamber elements, but is overdimensioned so that if the two chamber elements are pressed against one another, a pressure that is directed axially and radially inward is exerted upon the seal. In order to be able to brace the two flanges against one another, three screw bolts are provided, distributed uniformly about the circumference of the flange, while hexagonal socket screws are provided for bracing the two chamber elements. To assemble the pipe union, first the two chamber elements are screwed together using the hexagonal socket screws, once the seal has been fitted accurately over the butt joint, then the clamping elements are pushed to a stop against the chamber elements, and next the flanges are pushed to a stop against the clamping elements. The flanges are braced against one another by tightening the screw bolts. The result is the above-explained deformation of the clamping elements, which by this means effect a frictional union, and if there is a scarfed inwardly located clamping rim a form-fitting union as well, between the flange and the pipe end.

The above-described structure is complicated in design and difficult to assemble.

DISCLOSURE OF THE INVENTION

It is accordingly an object of the invention to provide a pipe union which is relatively simple in construction and easy to assemble. This object is attained by a pipe union for joining two pipe ends in end-to-end (butt) relationship which comprises (a) a shaped seal fitted over abutting pipe ends, the seal including: (1) an outer elastomeric ring having a central annular groove, outer and inner peripheral surfaces, and side surfaces, the inner peripheral surface contacting the pipe ends; (2) an inner ring received in the central annular groove and extending radially inward of the groove between the abutting pipe ends; (b) a separate clamping disk abutting each side surface of the outer elastomeric ring, each of the clamping disks being curved in profile and including: (1) a radially inward clamping rim forming an inside diameter for receiving the outer perimeter of a respective pipe end; and (2) a radially outward clamping rim forming an outside diameter; (c) a separate flange positioned on each of the pipe ends and over a respective clamping disk opposite the shaped seal; and (d) means for flattening the curved profiles of the clamping disks, thereby increasing their outside diameters and decreasing their inside diameters to form a clamping seal on the pipe ends.

BRIEF DESCRIPTION OF THE DRAWINGS

For a full understanding of the invention, the disclosure should be read in conjunction with the drawings. The drawings illustrate one embodiment of the invention, given by way of example, wherein:

FIG. 3 is a section view of a shaped seal corresponding to FIG. 1a;

FIG. 7 is a section view of an inner ring of the shaped seal corresponding to FIG. 1a;

FIG. 9 is a section view of a cap disk corresponding to FIG. 1a;

FIG. 10 is a plan view of the cap disk of FIG. 9;

FIG. 11 shows a flange in a section corresponding to FIG. 1a;

DETAILED DESCRIPTION OF THE PREFERRED EMBODIMENTS

Figure 1:
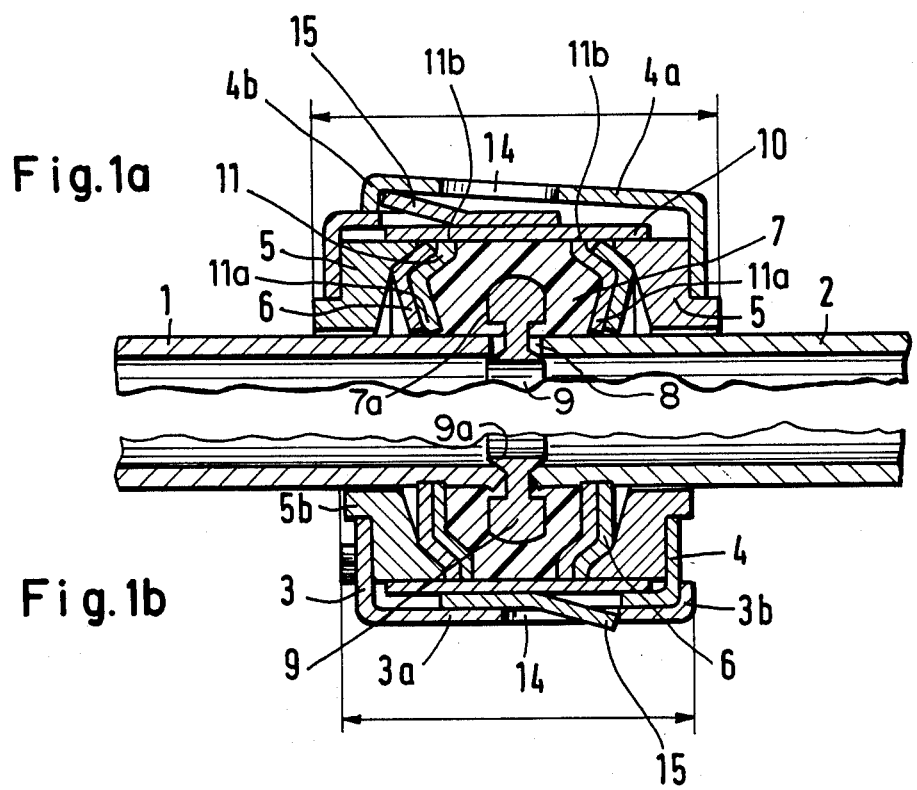
FIG. 1a is a longitudinal section of an upper half of a pipe union constructed according to a preferred embodiment of the present invention at its first detent position.
FIG. 1b is a longitudinal section of a lower half of the pipe union of FIG. 1a at its second detent position.
Figure 2:
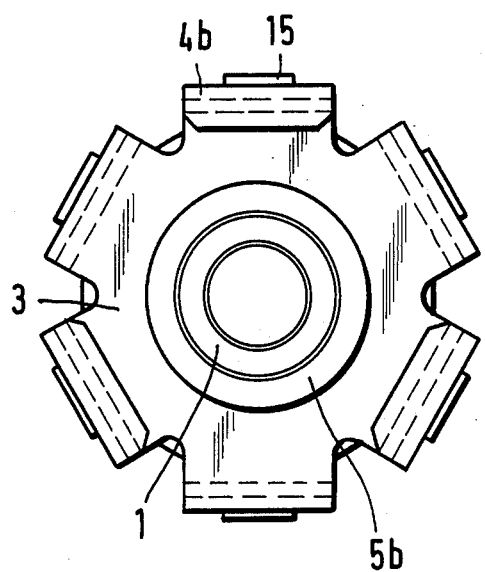
FIG. 2 is an the pipe union of FIG. 1 in an end view.

The shaped seal of the invention has two axial ends each protruding into a respective adapted recess of a pair of seal chamber elements covering the seal. The seal comprises an outer elastomer ring supported on the jacket faces of the two pipe ends and has a central annular groove that is open to the inside. An inner ring that overlaps the end-to-end butt joint is pressed loosely into this central annular groove. The clamping elements are supported with a radially inwardly located clamping rim on the associated pipe end, and with a radially outwardly located clamping rim on a clamping face disposed concentrically to the pipe ends. The clamping elements are curved outward in the axial direction in such a manner that an axial force exerted upon the clamping element in the direction toward the butt joint causes an increase in the outside diameter and a decrease in the inside diameter of the clamping element.

The invention provides for embodying the clamping element and the chamber element each as clamping disks, which can advantageously be firmly joined to the shaped seal. The shaped seal can be fabricated in an injection molding die, into which the two outwardly located clamping disks as well as the above-mentioned inner ring are placed. The inner ring is not firmly joined to the elastomer by the injection molding process, however. The clamping disks preferably have radial slits, which during the injection molding process become filled up with the elastomer, thereby producing a form-fitting union between the two clamping disks and the shaped seal. Thus the two clamping disks, the elastomer ring and the inner ring of the elastomer ring all form a single structural part, which is easy to handle and can be rapidly assembled.

The radially outwardly located clamping rim of the clamping disk can include an outer leg that is bent away from the butt joint and which is adjoined by an inner leg that is bent in the opposite direction. The clamping disk can be resilient. It is also possible, however, for the annular bend between the outer leg and the inner leg to be embodied as a predetermined breaking point. In a modified embodiment, the clamping disk can also comprise a separate outer ring and a separate inner ring.

A cap disk can be pushed loosely onto each of the pipe ends between the flange and the clamping disk. The cap disk can be embodied similarly to the clamping disk and may additionally exert a clamping action as well. The cap disk preferably has radial notches, but the number of notches should be different from the number of radial slits in the clamping disk. This is intended to prevent the elastomer from passing through the radial slits and getting into the notches of the cap disks. Each cap disk should have at least six notches.

The cap disk may be supported with a bent outer leg against a conical annular surface of the associated flange. As a result, a compact structure is attained on the one hand, and on the other hand there is a favorable induction of force when the two flanges are compressed.

A pipe segment, the inner jacket of which forms the clamping faces for the clamping disks as well as a support surface for the shaped seal, can be fitted onto the two flanges.

The inner ring of the shaped seal can plunge with a respective cone into the associated pipe end, with the greatest conical diameter being somewhat greater than the inside diameter of the inside of the pipe. When the pipe union is compressed, this causes a slight spreading open of the pipe ends, resulting in an even better seal.

Various constructions can be used for the device for bracing the two flanges against one another. Conceivable examples include screw connections, bayonet closures, and the like. However, a purely plug connection appears to be particularly suitable, comprising respective shells each overlapping one flange, which are joined together in the braced state by means of a plug connection.

Further details of the invention as well as its advantages will now be explained, in terms of an exemplary embodiment.

The novel pipe union is particularly suitable for high pressures and for absorbing pressure pulsations and vibrations. The pipe union can be used particularly to join pipes of relatively small diameter, for instance in joining brake and fuel pipes in the automotive industry. However, the fields where these pipe unions are applicable also encompass more than the automotive industry; in particular, they also include the general fields of hydraulics and pneumatics. An important advantage of the pipe union is its amenability to assembly by robots, because the union is effected without threads, screws, or the like.

The novel pipe union is also suitable for use in domestic engineering, however. In this field, hard-soldered copper pipes are conveniently used, even though specialists in the field have long been aware that every hard-soldered point is a point where corrosion can occur. Thus the avoidance of soldered points offers substantial advantages. Furthermore, by means of the novel pipe union it becomes possible for the first time to use special-steel pipes in domestic engineering.

The pipe union according to FIG. 1 comprises two pipe ends 1,2 that are to be in joined end-to-end relation to one another, and onto each of which a respective shell 3 or 4, a flange 5, and a cap disk 6 are first fitted. Between the two cap disks 6, a shaped seal is provided, which comprises an outer elastomer ring 7, supported on the jacket faces of the two pipe ends 1,2 and having a central annular groove 7a open toward the inside. An inner ring 9 that overlaps the end-to-end (butt) joint 8 between the two pipe ends 1,2 is pressed loosely into the annular groove 7a. A pipe segment 10 is fitted onto the two flanges 5. To effect the pipe union, the two flanges 5 are pressed against one another in the axial direction far enough that the two sheels 3,4 that overlap one another lock into place with one another and thus effect a form-fitting union.

Figure 3:
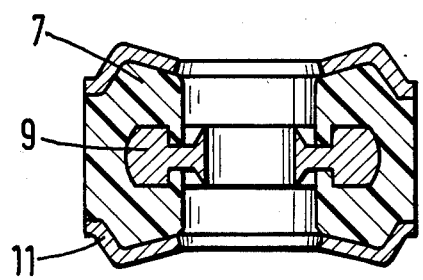
Figure 4:
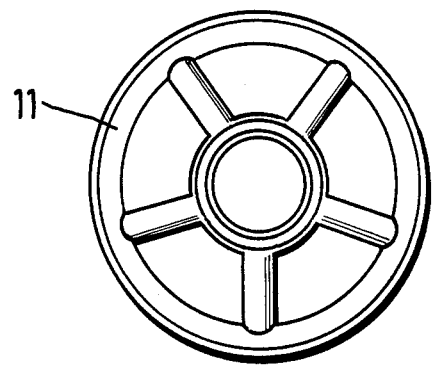
FIG. 4 is an end view of the shaped seal of FIG. 3.
Figure 5:
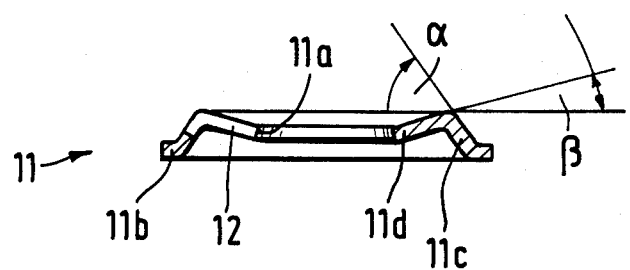
FIG. 5 is a section view of a clamping disk corresponding to FIG. 3.
Figure 6:
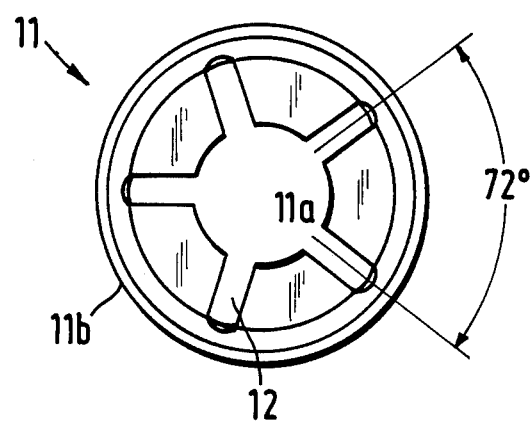
FIG. 6 is a plan view of the clamping disk of FIG. 5.

FIG. 3 shows that the elastomer ring 7 is covered on both sides by clamping disk 11, which are shown in greater detail in FIGS. 5 and 6. As shown there, each clamping disk 11 has five relatively wide radial slits 12, into which the elastomer comprising the ring 7 penetrates when the shaped seal is injection molded, so that the clamping disks 11 are firmly joined to the elastomer ring 7.

FIG. 1 shows that the clamping disks 11 are supported with a radially inwardly located clamping rim 11a on the associated pipe end 1 or 2, and with a radially outwardly located clamping rim 11b on the inner wall of the pipe segment 10, the inner wall forming a clamping surface. FIG. 5 shows that the radially outwardly located clamping rim 11b is intregral with an outer leg 11c that is bent away from the end-to-end (butt) joint 8 and which is adjoined by an inner leg 11d that is bent in the opposite direction and is preferably longer in length. The positioning angle $\alpha$ of the outer leg 11c defined as the angle formed by the outer leg 11c with a plane 11e parallel to a right angle cross-section of the respective pipe end is larger than the positioning angle $\beta$ of the inner leg 11d defined as the angle formed by the inner leg 11b with the plane 11e; preferably, $\alpha$ equals about 65° and $\beta$ equals about 15°. The radial slits 12 extend from the inside as far as the radially outwardly located end of the inner leg 11d. These radial slits 12 are present in an odd number and in the exemplary embodiment the number equals five.

Figure 7:
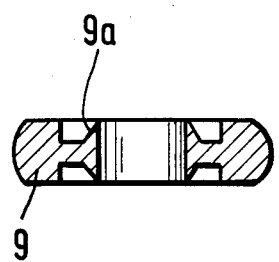
Figure 8:
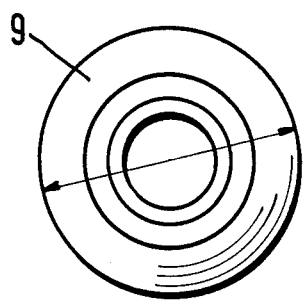
FIG. 8 is a plan view of the inner ring of FIG. 7.

FIGS. 1, 7, and 8 show that the inner ring 9 of the shaped seal is pressed into the undercut annular groove 7a of the elastomer ring and plunges with a respective cone 9a into the associated pipe end 1 or 2. The largest cone diameter is somewhat larger than the inside diameter of the inside of the pipe. As a result, when the pipe union is pressed together, a slight spreading open of the pipe ends 1,2 takes place (see the lower half of FIG.1).

Figure 11:
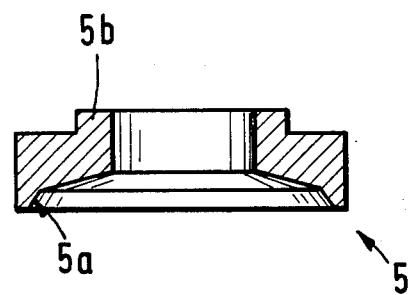
Figure 12:
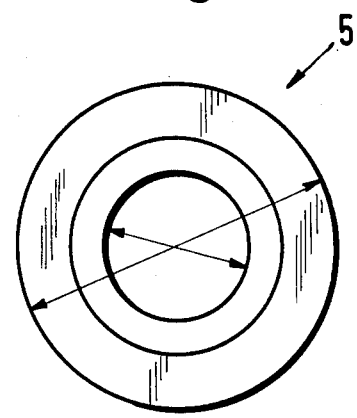
FIG. 12 is a plan view of the flange of FIG. 11.

The cap disk 6 which, as shown in FIG. 1, is loosely pressed onto the pipe ends 1,2 between the flange 5 and the clamping disk 11, is adapted to the outwardly curved contour of the clamping disk 11, as FIG. 1 particularly illustrates, and rests on the clamping disk over a large surface area. The cap disk 6 also has radial notches 13 (see FIG. 10), which extend from the inside as far as the radially outwardly located end of its inner leg 6a. The number of notches 13 should not be equal to the number of radial slits 12 in the clamping disk 11, and in the exemplary embodiment the number of radial notches 13 is six. The notches 13 are embodied narrower than the radial slits 12 of the clamping disk 11. The cap disk 6 is supported with its bent outer leg 6b against a conical annular face 5a of the associated flange 5 (see FIG. 1 as well as FIGS. 11 and 12).

Figure 13:
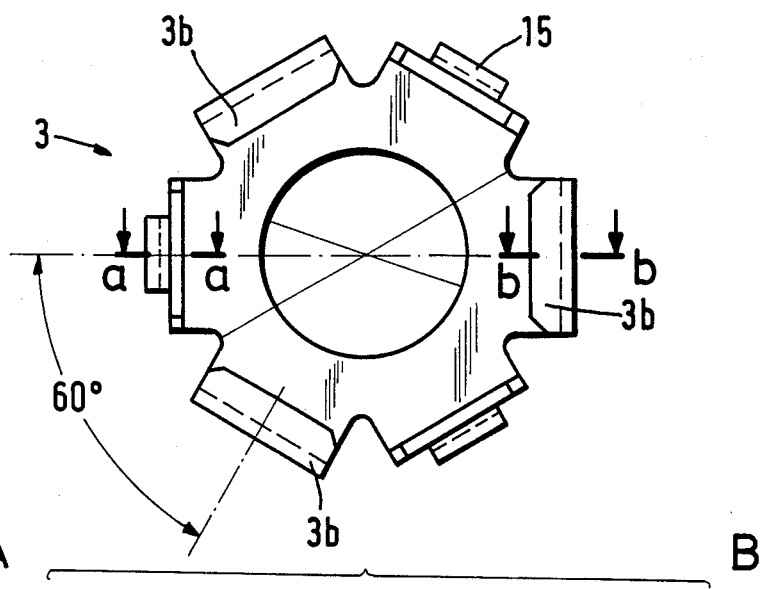
FIG. 13 is a plan view of a shell in plan view.
Figure 14:
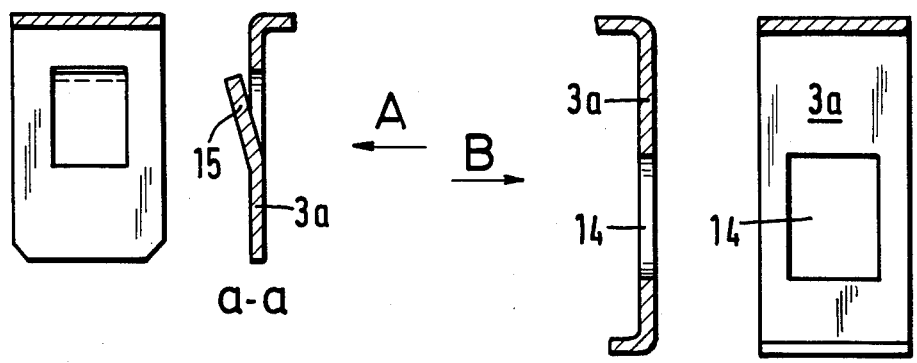
FIG. 14 is various detail sections taken through the shell of FIG. 13.

The device for bracing the two flanges 5 against one another comprises the two protruding shells 3,4 already mentioned, which are each pushed onto a respective annular collar 5b of the associated flange 5 and have axially extending claws 3a,4a (see FIG. 1 as well as FIGS. 13 and 14). The claws of one shell overlap the claws of the outer shell, and the outwardly located claws in each case have a recess 14, which is engaged by a spring tongue 15 that has been stamped out of the claw located therebelow. The claws located on the outside in each case have a bent portion 3b,4b on their free end, with which these claws, in a first detent position (see the upper half of FIG. 1), grip the free end of the associated spring tongue from behind and, in a second detent position (see the lower half of FIG. 1), grip the opposing shell, in each case in a form-fitting manner.

The pipe union is produced merely by pressing the two shells 3,4 axially against one another, until the second detent position as shown in the lower half of FIG. 1 is attained. Thus it is purely a plug connection that is involved, which is attainable without screw threads or the like.

What is claimed is:

1. A pipe union for joining end portions of two pipes in an end-to-end relationship, comprising:
   (a) a seal adapted to be fitted about opposing pipe end portions, said seal including:
      (1) an outer elastomeric ring having a central annular groove, outer and inner peripheral surfaces, and side surfaces, said inner peripheral surface adapted to contact said pipe end portions;
      (2) an inner ring received in said central annular groove and including a portion extending radially inward of said groove for being received between said pipe end portions;
   (b) separate clamping disks abutting each of said side surfaces of said outer elastomeric ring, each of said clamping disks having a curved cross-sectional profile and including:
      (1) a radially inward clamping rim forming an inside diameter for receiving an outer perimeter of a respective pipe end portion; and
      (2) a radially outward clamping rim forming an outside diameter;
   (c) separate flanges adapted to be positioned on each of said pipe end portions, said flanges being received over a respective one of said clamping disks, said flanges located opposite said disks from said shaped seal; and
   (d) means for changing said curved cross-sectional profiles of said clamping disks, thereby increasing said outside diameters and decreasing said inside diameters so as to clamp said pipe end portions, said means for changing said curved profiles of said clamping disks including:
      (1) a pipe segment fitted over said flanges, said pipe segment having an inner surface which forms a clamping face for said clamping disks; and
      (2) means for exerting an axial force on said flanges.

2. A pipe union as claimed in claim 1, wherein each clamping disk further includes means for securing said clamping disk to said shaped seal.

3. A pipe union as claimed in claim 2, wherein said securing means for securement includes a plurality of radial slits for receiving the elastomer of said elastomeric ring.

4. A pipe union as claimed in claim 3, wherein each disk has a radially inner leg, said radial slits of each clamping disk extending from said inside diameter as far as a radially outwardly located edge portion of said inner leg portion.

5. A pipe union as claimed in claim 3, wherein the number of radial slits of said clamping disk is odd and amounts to at least five.

6. A pipe union as claimed in claim 1, wherein each clamping disk further includes inner and outer legs formed by said curved cross-sectional profile, said outer leg adjoining said outward clamping rim and said inner leg adjoining said inward clamping rim, and wherein said outer leg is bent at an angle relative to said inner leg, whereby said outer leg is located radially outward from and oriented obliquely to said pipe portions.

7. A pipe union as claimed in claim 6, wherein said outer leg of said clamping disk is shorter than said inner leg.

8. A pipe union as claimed in claim 6, wherein a positioning angle of said outer leg of said clamping disk is larger than a positioning angle of said inner leg.

9. A pipe union as claimed in claim 6, wherein an annular bend between said outer and inner legs comprises a predetermined breaking point.

10. A pipe union as claimed in claim 1, further including separate cap disks adapted to be positioned loosely onto each of said pipe end portions, said cap disks positioned between a respective flange and clamping disk.

11. A pipe union as claimed in claim 10, wherein each cap disk is adapted contact an outwardly curved surface contour of the respective clamping disk.

12. A pipe union as claimed in claim 10, wherein said cap disk includes an inner and outer cap leg and a plurality of radial notches extending from said inner cap leg to an edge portion of said outer cap leg.

13. A pipe union as claimed in claim 12, wherein the number of said notches in said cap disk is even.

14. A pipe union as claimed in claim 12, wherein said notches of said cap disk are narrower than said radial slits of said clamping disk.

15. A pipe union as claimed in claim 10, wherein said cap disk is supported with its bent outer leg against a conical annular face of a respective flange.

16. A pipe union as claimed in claim 1, wherein said means for exerting an axial force on said flanges includes separate shells overlapping each of said flanges, said separate shells being joined with one another, in a braced position, by a clip connection.

17. A pipe union as claimed in claim 16, wherein said shells are adapted to be fitted onto said pipe end portions, said shells overlapping one another.

18. A pipe union as claimed in claim 16, wherein each said shell includes axially extending claws, some of which claws grip an opposing flange from behind, while the other said claws are overlapped and engaged by said claws of said outer shell.

19. A pipe union as claimed in claim 16, wherein a portion of said claws of one said shell overlap and engage resiliently upwardly bent tongues of the other said shell in a first axially compressed detent position, and overlap and engage the other shell and an opposing flange, in a second detent position.

20. A pipe union as claimed in claim 19, wherein said tongues at said second detent position engage corresponding recesses of said overlapping claws.

21. A pipe union as claimed in claim 1, wherein said inner ring includes a radially inner, annular cone-shaped segment for extending between the pipe end portions, said segment having an annular diameter larger than an inside diameter of said pipe ends.

* * * * *